United States Patent [19]

Taomo et al.

[11] Patent Number: 5,664,543

[45] Date of Patent: Sep. 9, 1997

[54] HAND LEVER DEVICE

[75] Inventors: Toshio Taomo, Nishitama-gun; Hisato Ohsawa, Hamura; Hirofumi Yamami, Akishima; Fumihiko Aiyama, Musashimurayama, all of Japan

[73] Assignee: Kioritz Corporation, Tokyo, Japan

[21] Appl. No.: 667,855

[22] Filed: Jun. 20, 1996

[30] Foreign Application Priority Data

Jun. 23, 1995 [JP] Japan ................... 7-158238

[51] Int. Cl.$^6$ ...................................... F02D 7/00
[52] U.S. Cl. ............................................ 123/400
[58] Field of Search ..................... 123/398, 400, 123/397; 74/501.6; 251/294

[56] References Cited

U.S. PATENT DOCUMENTS

| 4,245,713 | 1/1981 | Mochida et al. | 123/398 |
| 4,302,880 | 12/1981 | Elfving et al. | 123/398 |
| 4,570,593 | 2/1986 | Take et al. | 123/400 |
| 5,133,320 | 7/1992 | Kato et al. | 123/397 |

FOREIGN PATENT DOCUMENTS 57-47405  10/1982  Japan ................... 123/400

Primary Examiner—Raymond A. Nelli
Attorney, Agent, or Firm—Cushman Darby & Cushman IP Group of Pillsbury Madison & Sutro LLP

[57] ABSTRACT

A hand lever device is disclosed for adjusting the degree of openness of a throttle valve via a cable and kept at a desired opening degree and yet immediately returned to a minimum degree of opening to ensure high safety, thereby diminishing fatigue of fingers, and ensuring a desired level of operation. The hand lever device comprises a main lever (3) and a sub-lever (50) is attached to a wind-up tractive member (60) which draws a cable (20) connected to a throttle valve (CV) in such a manner that one end portion of the cable (20) is wound up thereon, and a torsion coil spring (42) is used as a brake operated by the main lever (30) for braking the wind-up tractive member (60) in order to hold the sub-lever (50) immobilized at any pivotally operated position.

6 Claims, 4 Drawing Sheets

HAND LEVER DEVICE

BACKGROUND OF THE INVENTION

1. Field of the Invention

The present invention relates to a hand lever device for operating a drive member, such as a throttle valve, of an internal combustion engine via a cable. In particular, the hand lever is preferably mounted on a working machine, such as a hedge trimmer or brush cutter, in the vicinity of a hand grip so that it is easy and convenient to operate such a throttle valve or the like via a throttle cable or the like.

2. Description of the Prior Art

For example, in a working machine such as a hedge trimmer and brush cutter, which includes an operative device such as a cutting blade or the like driven by an internal combustion engine, a hand lever device for controlling engine speed has been provided for controlling the degree of opening of a throttle valve of the internal combustion engine. Such hand levers have been mounted in the vicinity of a grip of a U-shaped handle, a bar handle or the like of the working machine so as to provide manual control of the output force of the internal combustion engine.

The hand lever device is generally provided with a throttle trigger (throttle lever) operated by the operator's fingers and adapted to be pivotally operated to thereby control the degree of opening of the throttle valve via a throttle cable. In general, the throttle valve is always biased toward the direction of minimum opening for an idle condition. Accordingly, the throttle valve is normally kept at the idle opening degree for an idle speed and, when the throttle cable is drawn, it begins to open the throttle from that idle opening position toward an opening position for higher speed operation.

Such hand lever devices for controlling throttle valve settings have been known to include an automatic return to an idle type arrangement. Consequently, when such a throttle lever is released from a pivotally operated position, the lever is automatically returned to its original idle position setting thereby moving the throttle valve to its idle setting. Conversely, such a hand lever could be of an immobilizable type such that when fingers are released from a throttle lever, the throttle lever will be held immobilized at a desired pivotally operated position (see Japanese Examined Utility Model Publication No. 19944/1982; etc.).

In the auto-return type, when fingers are released from the throttle lever, the engine is automatically returned to an idling condition. Consequently, when the auto-return type is used in a working machine, where the output force of the engine is transmitted to an operative portion including a cutting blade via a centrifugal clutch, the centrifugal clutch is disconnected to cut off the transmission of the driving force to the operative portion. Accordingly, the operation of the machinery can immediately be stopped by returning the throttle valve to the opening degree for idle rotation if an accident occurs, thereby advantageously attaining improved safety. On the other hand, the throttle valve must be held continuously by fingers at a desired pivotally operated position to achieve desired operation of the machinery. This causes problems in that this type is awkward with respect to intermediate opening degrees, the fingers remain susceptible to fatigue, and the speed of the engine is likely to be unstable.

In contrast thereto, the immobilizable type is capable of solving the above problems associated with the auto-return to idle rotation opening degree type. The immobilization type advantageously holds the throttle lever at a desired pivotally operated position without being held by the operator's fingers. That operation is preferred because the fingers are liberated from holding it. However, since additional operation is required to release the throttle lever from the immobilization position, it is impossible to immediately stop the machinery even if an accident occurs. Accordingly, there is a problem that, in terms of safety, the immobilizable type is inferior to the auto-return to idle rotation opening degree type.

SUMMARY OF THE INVENTION

The present invention has been made in view of these problems. It is, therefore, an object of the present invention is to provide a hand lever device which permits a throttle valve to be appropriately adjusted as to its degree of opening, via a cable, held at that setting and yet can be immediately return to the opening degree associated with an idle condition to ensure high safety, so that fatigue of fingers is diminished, and assures precise engine operation.

To attain the above-mentioned objectives, the hand lever device according to the present invention, as a basic embodiment, comprises a pivotally operated main lever and sub-lever.

The sub-lever is attached to a wind-up tractive member which draws a cable connected to a driven member in such a manner that one end of the cable is wound up thereon. A brake, for braking the wind-up tractive member, is operated by the main lever in order to hold the sub-lever immobilized at any pivotally operated position.

As preferred embodiments of the present invention, there may be mentioned one wherein the brake comprises a length of material, such as a wire or band, that is looped around the wind-up tractive member, one wherein a tension spring means is interposed between the brake and the main lever, one wherein the brake is adapted to operate when drawn by a slider of a slide link of a toggle mechanism with the main lever functioning as its swinging link, and one wherein the driven member is a throttle valve of an internal combustion engine.

In the case where the driven member is a throttle valve of an internal combustion engine, a hand lever device can be disposed in the vicinity of a handle grip of a working machine including a cutting blade driven by the engine where the throttle valve is biased in the direction of a degree of opening that will allow an idle running condition. When a throttle cable is used it will provide a mechanism to move the throttle valve to a wider open setting from an opening setting for running the engine at an idle condition.

A more preferred form of construction comprises a main lever and a sub-lever which are each pivotally operated. The sub-lever is attached to a wind-up tractive member which draws a cable connected to a driven member in such a manner that one end portion of the cable is wound up thereon. Also included is a brake composed of a wire or band, one end of which is fixed to and circumferentially looped around the wind-up tractive member. The wind-up tractive member is held immobilized at any pivotally operated position against the tractive force of the throttle cable by frictional force between the wind-up tractive member and the brake generated by drawing the other end of the brake by the main lever via a tension spring.

In the preferred form of the hand lever device according to the present invention, which is constructed as described above, when the main lever pivotally moves to the set position close to the handle, the brake composed of a band or the like is brought into action by the main lever via the tension spring, thereby generating frictional force between the windup tractive member and the brake.

In this condition, while holding (gripping) the main lever at the set position, the sub-lever can be pivotally operated against the frictional force between the wind-up tractive member and the brake means. By the pivotal operation of the sub-lever, the throttle cable is drawn to rotate the throttle valve from the minimum opening position determined for idle running to a more wide open position, thus adjusting the degree to which the throttle valve is opened. The internal combustion engine is thereby actuated at a desired operational speed.

In this connection, even if the fingers are removed from the sub-lever, the sub-lever is kept immobilized at its desired pivotally operated position by the frictional force between the wind-up tractive member and the brake against the tractive force by the throttle cable. Accordingly, the throttle valve is kept at the adjusted opening degree (set opening degree), thereby enabling fatigue of the fingers to be relieved.

In this condition, even if the main lever is brought somewhat apart from the grip, for example, by moderately loosening the hold thereon in order to re-grip the main lever, sufficient frictional force is still generated to enable the wind-up tractive member and the sub-lever to be kept immobilized at the pivotally operated position against the tractive force by the throttle cable because of the interposition of the tension spring between the brake and the main lever that pulls the brake against the wind-up tractive member.

In the event that it is necessary to immediately lower the rotational speed of the engine due to the occurrence of an accident or the like, the main lever can be completely released. The frictional force between the wind-up tractive member and the brake is thereby substantially removed to allow the wind-up tractive member, sub-lever, throttle cable and throttle valve to return to their respective original positions that changes the throttle valve to its idle setting. As a consequence, the engine is brought to its idle speed condition. When the working machine is an engine and the rotational driving force is transmitted to an operative device, such as a cutting blade or the like, via a centrifugal clutch, the centrifugal clutch is disconnected thereby cutting off the transmission of the driving force to the operative device, thereby immediately stopping operation of the operative device including a cutting blade or the like driven device.

Further, by the use of the main lever which functions as a swinging link of the toggle mechanism, the main lever brought to a position closer to the set position requires a smaller force to hold it. Accordingly, even if the grip is held for a long period of time with the main lever at the set position, the fingers will not become so tired.

DESCRIPTION OF THE PREFERRED EMBODIMENTS

The present invention will be described in more detail with reference to the accompanying drawings.

Figure 1:
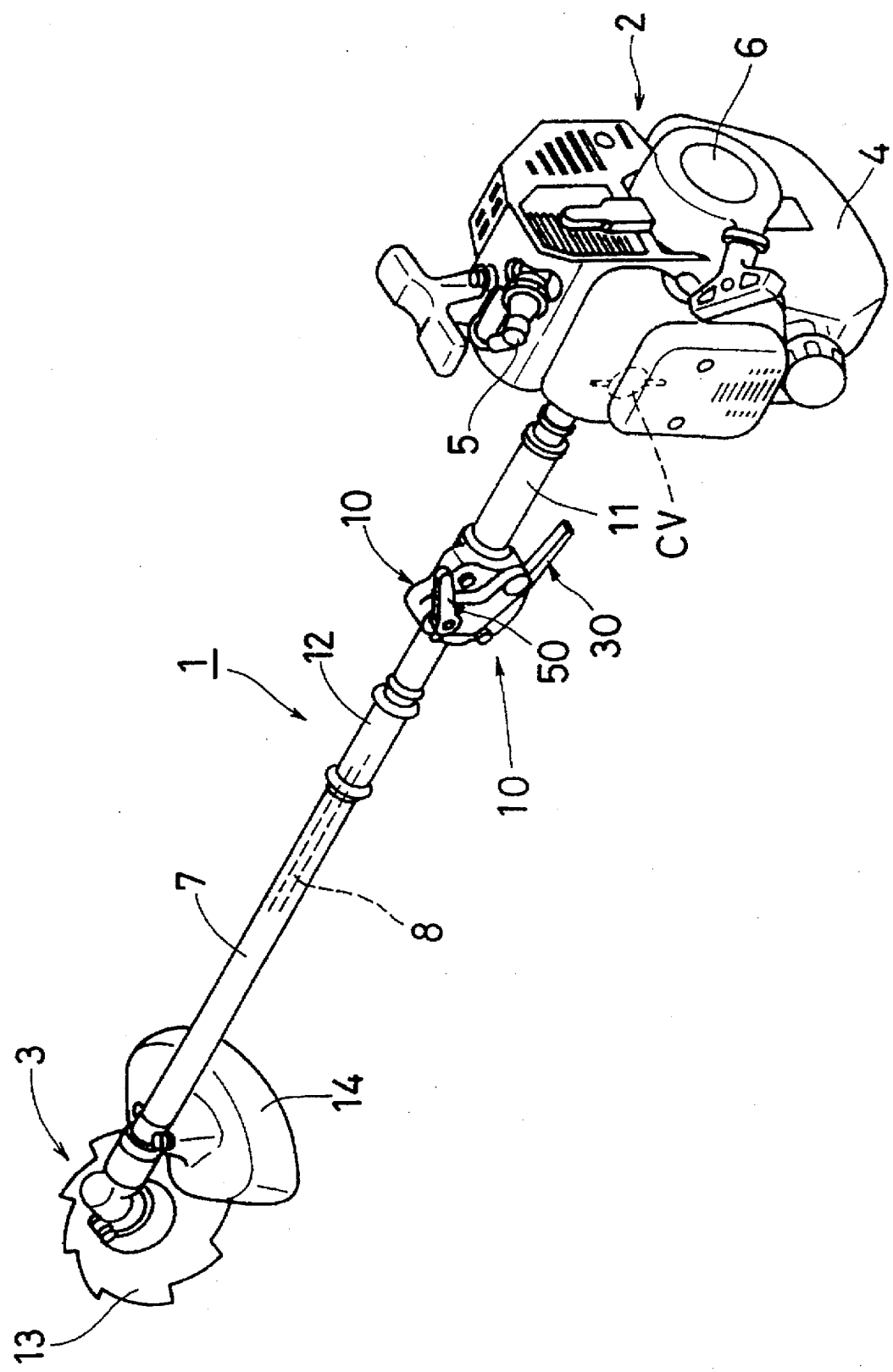
FIG. 1 is a perspective view showing an example of a brush cutter adopting one embodiment of the hand lever device according to the present invention.

FIG. 1 shows an example of a brush cutter employing one embodiment of the hand lever device according to the present invention. The illustrated brush cutter 1 comprises a bar handle or operating rod 7 provided with grips 11, 12 spaced a predetermined distance apart, an operative portion or driven device 3, provided on the distal end of the bar handle 7 and which can include a cutting blade 13 or other rotationally driven device, and a safety cover 14. The brush cutter 1 is powered by an internal combustion engine 2, for example, a small air-cooled two-cycle gasoline engine, which is disposed on the proximal end of the bar handle 7. The engine 2 provides the driving power source for driving the cutting blade 13 via a drive shaft 8 extending through and within the bar handle 7. The internal combustion engine 2 is provided with a carburetor (not shown) having a throttle valve CV and a spark plug 5.

In this example, the throttle valve CV is always biased in the direction of a minimum opening setting (for an idle running condition). When a throttle cable 20 (as shown in FIG. 2) connected thereto, which will be described below, is drawn or pulled from such a non-operating position, the throttle valve CV begins to open from that minimum opening idle setting.

One embodiment of the hand lever device 10, according to the present invention, is provided in the vicinity of the rear grip 11, which is one of the grips 11 and 12 that is gripped generally by an operator's right hand. The hand lever device 10 is used to adjust the degree of opening of the throttle valve CV.

Figure 2:
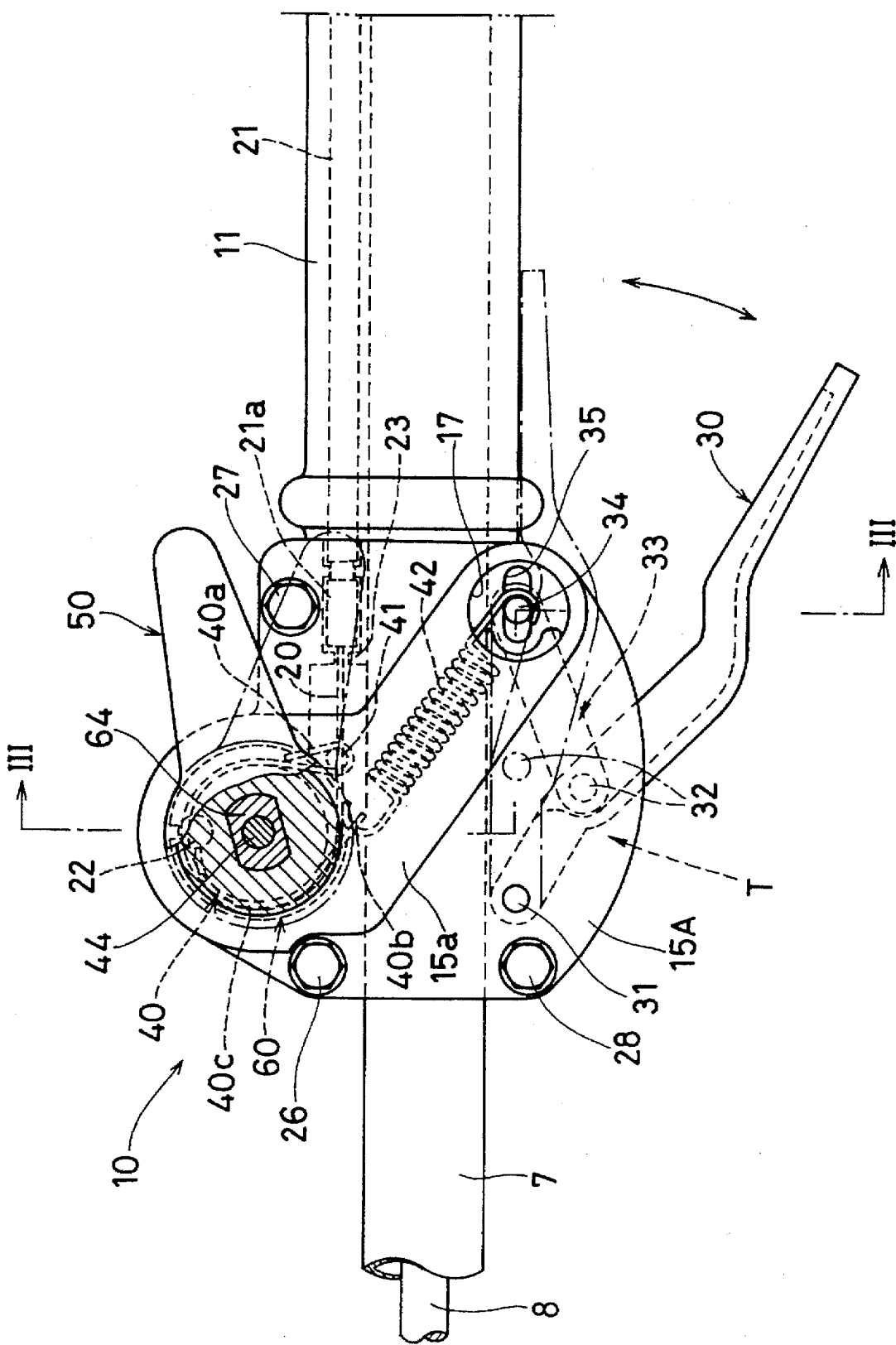
FIG. 2 is a partially cutaway left side view showing one embodiment of the hand lever device according to the present invention.
Figure 3:
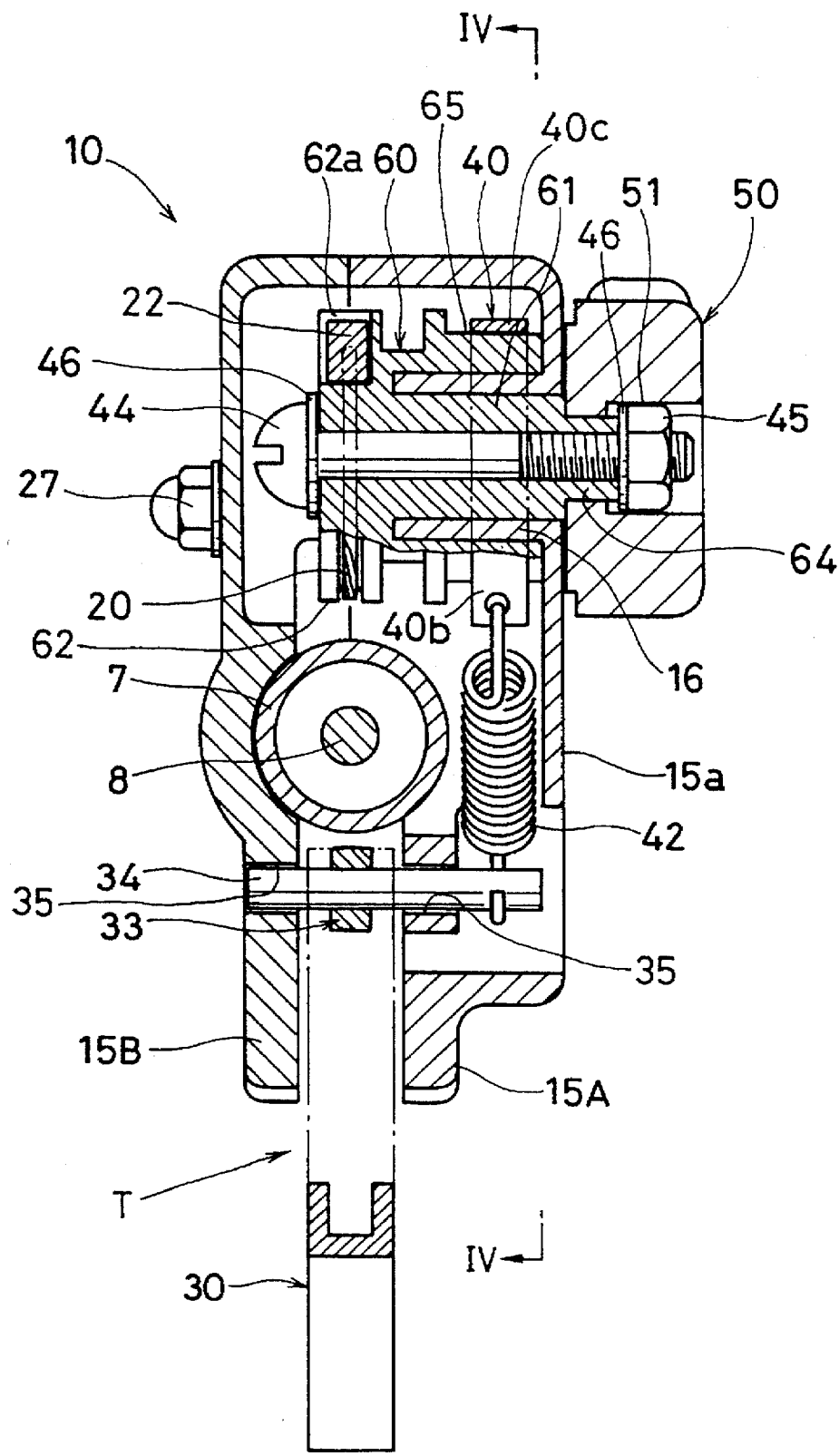
FIG. 3 is an enlarged sectional view taken along the line III—III and viewed in the direction of the arrows in FIG. 2.
Figure 4:
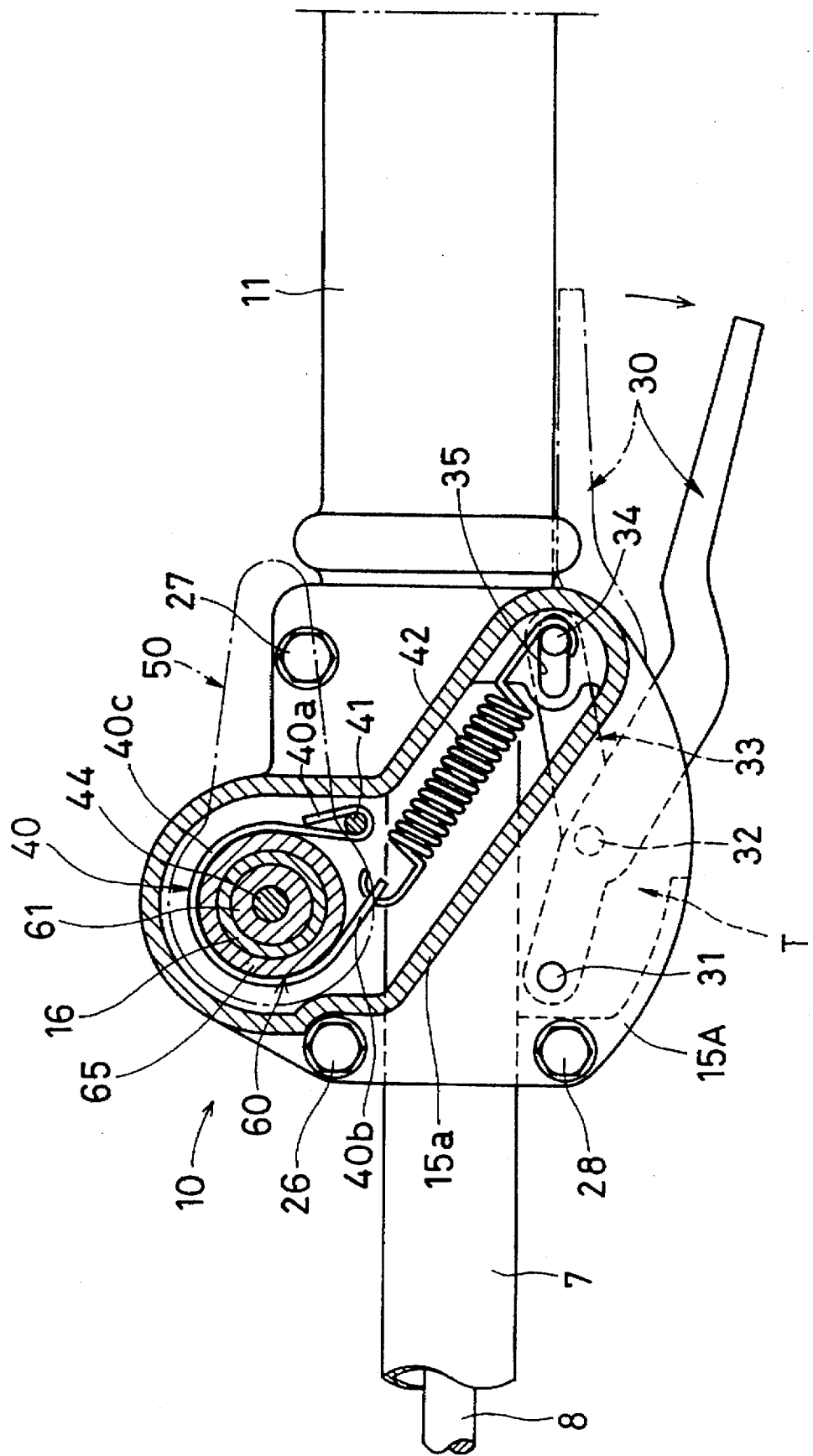
FIG. 4 is a sectional view taken along the line IV—IV and viewed in the direction of the arrows in FIG. 3.

As shown in FIGS. 2 to 4, the hand lever device 10 comprises a main lever 30, which is pivotally supported at its base end by a pin 31 and which has a substantially "boomerang like" or "dog-legged" shaped, a wind-up tractive member 60, which will be described below, and a sub-lever 50 which is unitedly fixed or attached to the opposite end of the pivotal axis of the wind-up tractive member 60. A housing 15 is provided for pivotally holding these components and is composed of right and left cover members 15A, 15B (hereinafter often referred to simply as cover 15A, 15B), the former of which has an outwardly extending tray shaped protrusion 15a. The cover members 15A, 15B, fit around the bar handle 7 adjacent the grip 11. The housing 15 is fixedly mounted onto the bar handle 7, for example, by means of a clamping assortment (which is general term for a combination of a screw, a nut, a washer and the like, and the same applies hereinbelow) used at three positions 26, 27 and 28.

As well seen with reference to FIG. 3, the cover member 15A is provided with an inwardly extending cylindrical bearing 16 and a pin portion 61 of the wind-up tractive member 60 is rotatably inserted in the bearing 16. A right end portion of the pin portion 61 is provided with a pulley-like grooved wind-up portion 62, and a left end portion of the pin portion 61 has its sides parallelly cut off, as shown in FIG. 2, to provide a rotation-preventive fixing portion 64. The rotation preventive fixing portion 64 is fitted into a hollow portion 51 formed in the base end of the sub-lever 50, and the sub-lever 50 is unitedly fixed to the pin portion 61 by means of a screw 44 inserted along the axis of the wind-up tractive member 60, a nut 45 and washers 46. The wind-up tractive member 60 and the sub-lever 50, which are unified by these elements, are rotatably held in the bearing 16 and thereby supported by the cover member 15A. Provided between the grooved wind-up portion 62 and the rotation-preventive fixing portion 64 in the pin portion 61 is a brake drum 65 in the form of a cylinder with one end closed and loosely fitted over the bearing 16.

One end of a throttle cable 20, connected to the throttle valve CV of the internal combustion engine 2, is led between the cover members 15A and 15B and above the bar handle 7 with the other end being inserted through an outer tube 21 of a Bowden cable. The distal end of the outer tube 21 is fastened by a fastening means 23 provided in the cover 15A, 15B. The one end of the throttle cable 20 is reeved around the grooved wind-up portion 62 of the wind-up tractive member 60 and locked in place with a terminal metal piece 22, which is attached to the one end thereof, by being fitted in a locking notch 62a formed in the grooved wind-up portion 62.

A band portion 40c of a band brake 40 is looped around the brake drum 65 of the wind-up tractive member 60. A front end 40a is fastened to a retaining pin 41, as shown in FIG. 2, that is provided in the housing 15 and whose rear end 40b, shown in FIGS. 2 and 3, is connected via a tension coil spring 42 to a slide pin 34, which functions as a slider within a slide link 33 in a toggle mechanism T, in which the main lever 30 functions as its swinging link which will be described below.

The toggle mechanism T, with the main lever 30 functioning as its swinging link, comprises the slide link 33 one end of which is pivotally connected to the main lever 30 by a pin 32 at a position relatively near the base end of the main lever 30. The other end of the slide link 33 is pivotally mounted on the slide pin 34, which is inserted therethrough.

When the main lever 30 is gripped and operated by the fingers of a hand to pivotally move it from a complete release position, shown by the solid line in FIG. 2, to a set position close to the grip 11, which is shown in phantom in FIG. 2, the pin 32, moves upwardly. Since the pin 32 is a joint between the main lever 30 and the slide link 33, the slide link 33 is brought from a lower position below a straight line connecting the pin 31, which pivotally supports the base end of the main lever 30, and the slide pin 34, which is itself slidably inserted through elongated holes 35, 35 formed in the cover members 15A, 15B and extend horizontally in the longitudinal direction and have a predetermined length, to a raised position, shown in phantom in FIG. 2, in parallel with that same straight line. Slide pin 34 is itself caused to move in the holes 35, 35 to the right or backwardly in FIG. 2. Consequently, the rear end 40b of the band brake 40 is drawn rearwardly via the tension coil spring 42.

In the hand lever device 10 of this embodiment constructed as described above, when the main lever 30 is pivoted from the complete release position, shown by the solid line in FIG. 2, to the set position (immediately short of dead point) close to the rear grip 11 of the bar handle 7, as shown in phantom in FIG. 2, the band brake 40 is drawn via the tension coil spring 42 by the slide pin 34 of the toggle mechanism T, including the main lever 30 and thereby brought into action. Consequently, frictional force is generated between the brake drum 65 of the wind-up tractive member 60 and the band portion 40c of the band brake 40.

In this condition, while holding (gripping) the main lever 30 at the set position, the sub-lever 50 can pivotally be operated against the frictional force between the brake drum 65 of the wind-up tractive member 60 and the band brake 40. By the pivotal operation of the sub-lever 50, in a clockwise direction viewed in FIG. 2, the throttle cable 20 is drawn and rotates the throttle valve CV from an opening setting for an idle running condition to a further open position, thus adjusting the degree of opening of the throttle valve CV. The internal combustion engine 2 is thereby actuated at a desired operating or rotational speed.

In this connection, even if the fingers are removed from the sub-lever 50, the sub-lever 50 is kept immobilized at the pivotally operated position by the frictional force between the brake drum 65 of the wind-up tractive member 60 and the band portion 40c of the band brake 40 against the tractive force of the throttle cable 20. Accordingly, the throttle valve CV is kept at the adjusted opening or set position, thereby enabling fatigue of the fingers to be relieved.

In this condition, even if the main lever 30 is brought somewhat apart from the rear grip 11 as shown by the solid line in FIG. 4, for example, by moderately loosening the grip thereon in order to re-grip the main lever 30, sufficient frictional force is still generated because of the interposition of the tension coil spring 42, between the brake drum 65 and the band brake 40 by biasing force of the tension coil spring 42 to enable the wind-up tractive member 60 and the sub-lever 50 to be kept immobilized at the pivotally operated position against the tractive force from the throttle cable 20.

It is to be noted that the sub-lever 50 may pivotally be moved by fingers while keeping the main lever 30 gripped to the utmost.

In the event that it is necessary to immediately lower the operational speed of the engine 2 due to the occurrence of accident or the like, the main lever 30 is completely released. The frictional force between the brake drum 65 and the band brake 40 is thereby substantially removed to allow the wind-up tractive member 60, the sub-lever 50, the throttle cable 20 and the throttle valve CV to return to their respective original positions for the degree of opening for the idle operating condition. In consequence, the engine 2 is brought into its idle condition. In the case of the working machine 1 adapted to be such that rotational driving force of the engine 2 is transmitted to the operative portion 3 including the cutting blade 13 and the like via a centrifugal clutch, the centrifugal clutch is disconnected thus cutting off the transmission of the driving force to the operative portion 3, thereby immediately stopping the operation of the operative portion 3 including the cutting blade 13 and the like.

Further, by the use of the main lever 30 as a swinging link of the toggle mechanism T, less force is needed to hold the main lever 30 at a position close to the set position. Accordingly, even if the rear grip 11 is held for a long period of time with the main lever 30 at the set position, the fingers will not become so tired.

The present invention has been described in detail with reference to the one embodiment. It is, however, to be understood that the present invention is by no means restricted to the illustrated embodiment and that various modifications may be made within the scope hereof which does not depart from the spirit of the present invention as defined in the claims.

For example, in the above example, the hand lever device 10 according to the present invention is used to control the opening of the throttle valve CV of the internal combustion engine 2. It is, however, to be noted that the hand lever device according to the present invention may, of course, be used in other applications than adjustment of the opening degree of the throttle valve CV.

Further, the hand lever device 10 as such may be used by mounting it on a U-shaped handle and the like beside the bar handle 7.

As understood from the above description, according to the hand lever device of the present invention, excellent effects are attained, for example, that the throttle valve as a driven member can be adjusted appropriately in its opening degree via the cable and kept at a desired opening degree and yet immediately returned to the opening degree for idle rotation to ensure high safety, that fatigue of fingers is diminished, and that preferable operability can be attained.

What is claimed is:

1. A hand lever device comprising a housing, a main lever and a sub-lever pivotally attached to said housing;

said sub-lever being attached to a wind-up tractive member, a cable interconnected between said wind-up tractive member and a driven member in such a manner that one end portion of said cable is wound upon said wind-up tractive member, and a brake member operated by said main lever for braking said wind-up tractive member to hold said sub-lever immobilized at any pivotally operated position.

2. The hand lever device according to claim 1, wherein the brake member comprises a length of material looped around said wind-up tractive member.

3. The hand lever device according to claim 1 or 2, wherein a tension spring is interposed between said brake member and said main lever.

4. The hand lever device according to claim 3, wherein said brake member is adapted to operate when drawn by a slider of a slide link of a toggle mechanism with said main lever functioning as a swinging link of said toggle mechanism.

5. The hand lever device according to claim 4, wherein said driven member is a throttle valve of an internal combustion engine.

6. A hand lever device disposed in the vicinity of a grip of a handle of a working machine comprising a rotating member driven by an internal combustion engine provided with a throttle valve, said throttle valve being biased at a degree of opening for running said engine at an idle condition so that when a throttle cable connected thereto is drawn from the idle position, the throttle valve begins to open to a greater extent, said hand lever device comprising a main lever and a sub-lever which are pivotally operated, said sub-lever being attached to a wind-up tractive member, a throttle cable interconnected between said wind-up tractive member and said throttle valve, and a brake member having one end fixed to and circumferentially looped around said wind-up tractive member, another end of said brake member being connected to said main lever via a tension spring so that said wind-up tractive member is held immobilized at any pivotally operated position against the tractive force of said throttle cable by frictional force developed between said wind-up tractive member and said brake member which frictional force is generated by moving said main lever and tensioning said tension spring.

* * * * *